(12) United States Patent
Mitrosky et al.

(10) Patent No.: US 7,142,441 B2
(45) Date of Patent: Nov. 28, 2006

(54) METHOD FOR USING A PROGRAMMABLE OPERATING FREQUENCY FOR A DC-TO-DC CONVERTER FOR USE WITH EMBEDDED WIRELESS PRODUCTS

(75) Inventors: James S. Mitrosky, Margate, FL (US); Peter J. Bartels, Sunrise, FL (US); Andres I. Lacambra, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 309 days.

(21) Appl. No.: 10/955,555

(22) Filed: Sep. 30, 2004

(65) Prior Publication Data

US 2006/0072350 A1    Apr. 6, 2006

(51) Int. Cl.
  H02M 1/12   (2006.01)
  H04B 1/40   (2006.01)
  G05F 1/40   (2006.01)
(52) U.S. Cl. .......................................... 363/39; 455/572
(58) Field of Classification Search .................. 363/39, 363/40, 44; 340/2.1, 2.6, 2.7, 2.8, 5.61, 5.64, 340/825.72, 825.73; 455/1, 3.01, 11.1, 20, 455/22, 75, 127.1, 127.5, 560, 572, 574
See application file for complete search history.

(56) References Cited

U.S. PATENT DOCUMENTS 5,274,369 A * 12/1993 Tsunoda et al. ............ 340/7.32
5,420,576 A *  5/1995 Matai et al. ................ 340/7.43
5,926,013 A *  7/1999 Brandt ....................... 323/370
6,223,025 B1 *  4/2001 Tsukuda ..................... 340/7.37
6,385,470 B1 *  5/2002 Bendixen .................... 455/574
7,058,373 B1 *  6/2006 Grigore ..................... 455/127.1

OTHER PUBLICATIONS

ALINCO Parts & Service Dealers web pages printout of DM330MVE/MVT/MVZ information, 4 pages, printed Aug. 16, 2004.

* cited by examiner

Primary Examiner—Matthew V. Nguyen
(74) Attorney, Agent, or Firm—Miller Johnson

(57) ABSTRACT

A method for determining the switching frequency of a DC-to-DC power supply for a portable radio transceiver (300) includes determining a first group of switching frequencies (301) and then determining the switching harmonics based on that group of switching frequencies (305). These switching harmonics are then compared to a group of desired radio channels (311) where it is then determined if the switching frequencies interfere with the group of desired radio channels (313). Based on these results, a second group of switching frequencies is selected if the first set of switching frequencies provides an undesired level of interference (317, 319, 321).

6 Claims, 2 Drawing Sheets

METHOD FOR USING A PROGRAMMABLE OPERATING FREQUENCY FOR A DC-TO-DC CONVERTER FOR USE WITH EMBEDDED WIRELESS PRODUCTS

TECHNICAL FIELD

This invention relates in general to switching power supplies and more particularly to the selection of switching frequencies to avoid switching interference.

BACKGROUND

Switching power supplies are typically used in applications where a large and heavier linear type supply would not be appropriate. Switching power supplies typically rectify an alternating current (AC) power source where the resultant direct current (DC) voltage is fed to a group of high-frequency, high-power switching transistors. These switching transistors chop the DC voltage into a high frequency AC signal. The high frequency AC signal is then fed to a high frequency transformer that is wound to produce the correct output voltage. A high-frequency transformer is used since it can accommodate a great deal more power for its weight and size than those operating at a typical 50–60 Hz line frequency. Moreover, the filter capacitors used at the output of the high-frequency transformer can be much smaller than those operating at 60 Hz. Thus, a switching power supply can operate at a given voltage and current at a significantly smaller size than a linear power supply. Thus, switching power supply has been widely used in such applications as personal computer or other situations that require light weight and small size.

Another application of the switching power supply is in a DC-to-DC environment. Often, DC battery power is supplied to an electronic device that is over and above what is actually required for the device to operate efficiently. In this case, the DC power is switched and stepped-down in amplitude to provide a voltage that is appropriate to operate the device. Since the duty cycle of the switching transistor can be varied over a wide range and the switching transistors draw very little current when operating, a DC output voltage can be produced to power an electronic device with minimal current drain. An example of a typical DC-to-DC power supply 100 is shown in prior art FIG. 1 where an oscillator 101 supplies a switching reference signal to a digital controller 103. The digital controller 103 provides control such as phase information to drive buffer 105. The buffer 105 provides a switching control voltage to a switching network 107 which also accepts an input voltage 108. The switching network 107 works to lower the input DC voltage to some predetermined DC level where it can pass through a filter 109. The output voltage and current can then be measured by a current limiter 111 which acts to control the amount of current available at output 110.

One problem associated with all switching power supplies is the noise or interference produced at the fundamental switching frequency as well as its harmonic frequencies. This can be very problematic if the switching supply is used with a radio receiver as these harmonics can easily extend into the very high frequency (VHF) and ultra-high frequency (UHF) radio spectrums. If the radio is attempting to receive radio signal at or near a harmonic of the switching supply, this can greatly interfere with reception and signal quality to the extent that the radio anticipates a signal being received while no legitimate RF signal is actually present. Thus, as seen in FIG. 1, one way to mitigate this type of noise is to change the switching frequency such that the noise produced at the fundamental and harmonic frequencies do not interfere with the desired receiving frequency. This is accomplished by altering the oscillator 101 to ultimately control the rate upon which the input voltage 109 is switched.

Thus, the need exists provide a DC-to-DC switching power supply where the switching frequency can be easily programmable in order to strategically select the switching frequency to prevent unwanted switching noise and interference in a radio receiver.

SUMMARY OF THE INVENTION

Briefly, according to the invention, there is provided a method by which the actual frequency source of a switching power supply can be programmed so that harmonically related switching frequency products of the source can be easily changed to avoid interference. This works to eliminate the source of switching noise for any given radio at a desired frequency of operation.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
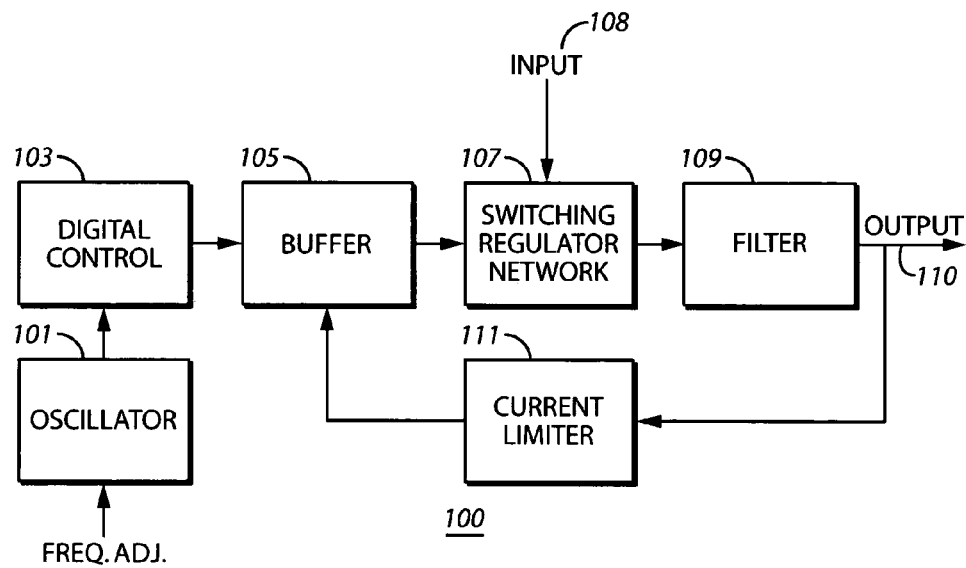
FIG. 1 is a prior art block diagram showing operation of a DC-to-DC switching power supply having an adjustable frequency oscillator.

While the specification concludes with claims defining the features of the invention that are regarded as novel, it is believed that the invention will be better understood from a consideration of the following description in conjunction with the drawing figures, in which like reference numerals are carried forward.

Figure 2:
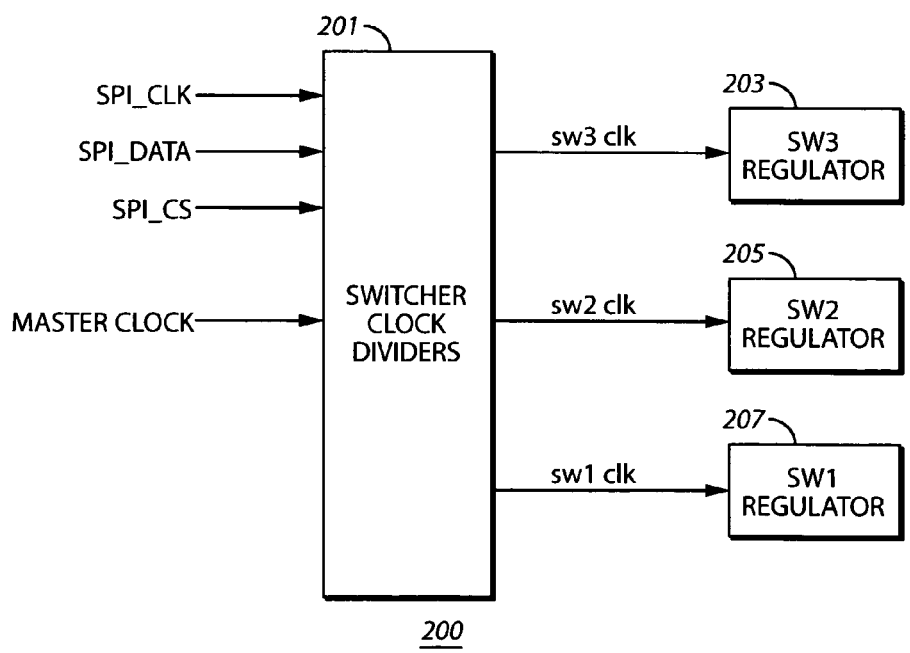
FIG. 2 is a block diagram showing operation of a switcher clock driver that can be programmed for operation at a predetermined switching frequency in accordance with the invention.

Referring now to FIG. 2, a programmable DC-to-DC converter 200 that typically may be included in a radio frequency (RF) receiver utilizes at least one programmable switching clock divider 201 that can be programmed using a serial peripheral interface (SPI) port, SPI data port and SPI CS port. These inputs, in addition to a master clock input, are typically available from a microprocessor (not shown) and allow the switching clock divider 201 to be set so as to control a plurality of switching regulators 203, 205, 207. Although three switching regulators are shown in FIG. 2, it will be evident to those skilled in the art that any number (n) of switching dividers can be controlled using the system of the present invention. This enables the switching frequency of switching regulators 203, 205, 207 to be precisely controlled to avoid switching noise produced through harmonics that may affect a desired frequency of receipt of an RF receiver.

Figure 3:
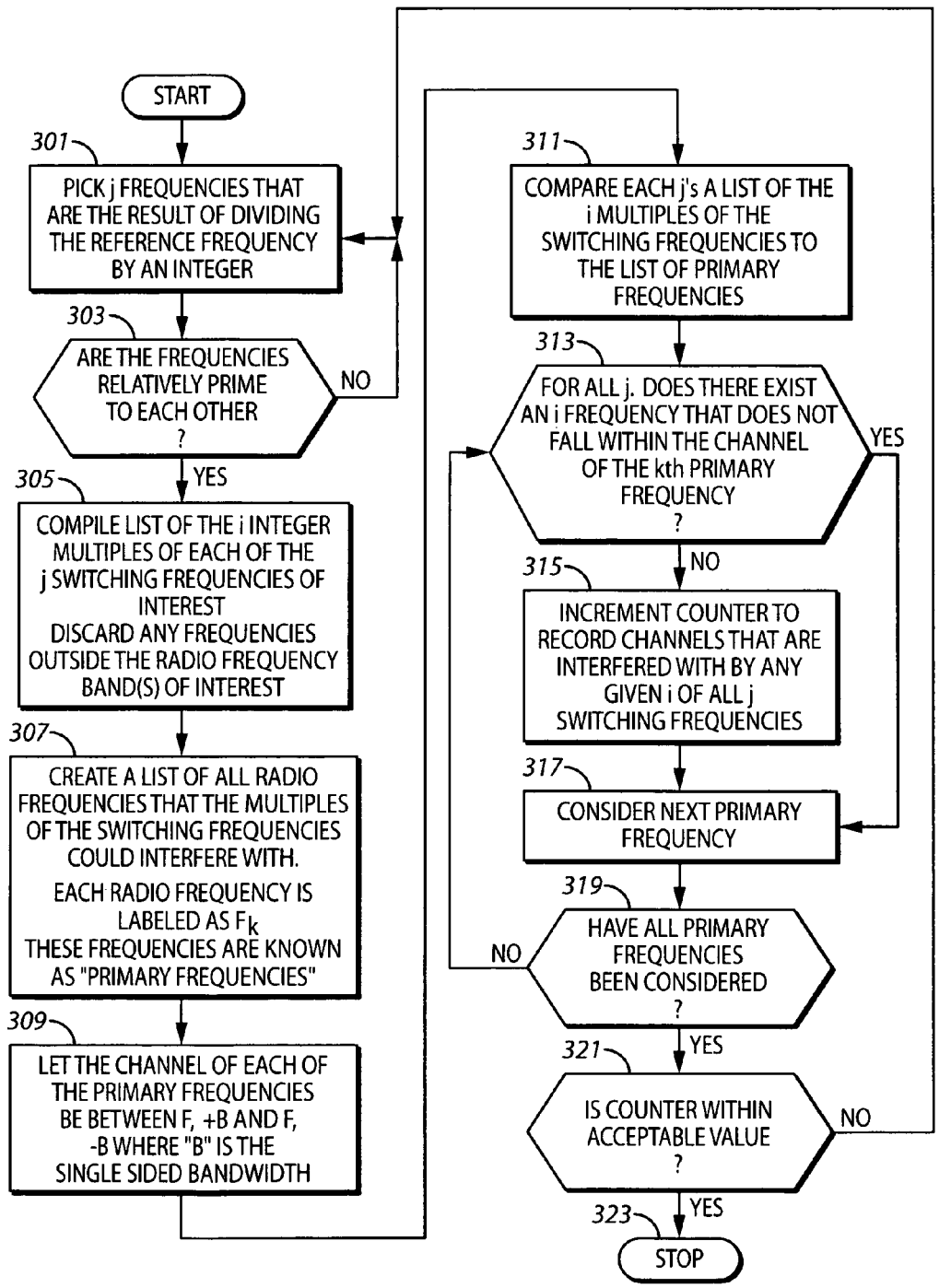
FIG. 3 is a flow chart diagram illustrating a method for selecting a switching frequency that will not provide switching noise at a desired frequency of operation in accordance with the present invention.

In FIG. 3, a method defining how the switching frequency may be selected 300 in accordance with the method of the invention includes selecting a set of frequencies (i) 301 that are the result of dividing a reference by an integer number. The set of i frequencies are tested 303 to determine if any of the frequencies are relatively prime to one another. If the set of i frequencies are not prime, a new set of frequencies is selected 301. If the set of i frequencies is relatively prime, a list of j integer multiples of each of the set of i switching frequencies of interest is compiled 305 where any frequencies that are outside the radio frequency bands of interest are discarded. A list of all radio frequencies that are multiples of the switching frequencies that can interfere is compiled 307 where each radio frequency is labeled as a "primary" frequency $F_k$. Each channel of each of the primary radio frequencies is then defined 309 as $F_k+B$ and $F_k-B$ where B is the single side bandwidth of the radio channel.

Each of the set of frequencies i is then compared 311 to the list of primary frequencies. The algorithm then determines 313 for all of the lists of j sets of i integer multiples, does there exist a set of frequencies that includes all j sets where no integer multiples of all i frequencies fall within the channel of the kth primary frequency. If no frequencies exist then the next primary frequency is considered 317. If a frequency does not exist then a counter is then incremented 315 to record channels that are interfered with by any given number of all of the list of all set of i frequencies. The next primary frequency is considered 317. If all primary frequencies have not been considered, then the method continues to determine 313 if a set of frequencies i does not fall within the channel of the kth primary frequency. Once all primary frequencies have been considered, the counter then determines 321 a predetermined value. If the counter is not within an acceptable value then a new set of i frequencies is selected 301. If the counter is within an acceptable value then the method ends 323 and the primary frequencies are used by the radio's microprocessor to control the switching clock divider as seen in FIG. 2.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for determining the switching frequency of a DC-to-DC power supply for a portable radio transceiver comprising the steps of:
   determining a first plurality of switching frequencies;
   determining a plurality of harmonics of the first plurality of switching frequencies;
   comparing the plurality of harmonics to a plurality of desired radio channels;
   determining if there are a predetermined number of switching frequencies that do not interfere with the plurality of desired radio channels; and
   selecting a second plurality of switching frequencies if the first set of switching frequencies provide an undesired level of interference.

2. A method for determining the switching frequency of a DC-to-DC power supply as in claim 1, further comprising the step of:
   storing at the portable radio transceiver the switching frequency of the DC-to-DC converter based upon the current radio receiver frequency.

3. A method for selecting a plurality of non-interfering switching frequencies for use with a DC-to-DC power regulator in a portable radio frequency (RF) transceiver comprising the steps of:
   selecting a first set of switching frequencies that are relative prime to each other;
   determining a corresponding set of harmonic frequencies based on the first set of switching frequencies;
   determining those radio frequencies that are to be used by the RF transceivers;
   comparing the list of radio frequencies to the set of harmonic frequencies;
   altering an acceptable number of radio frequency channels that are free of switching interference;
   selecting a second set of switching frequencies if the set of harmonic frequencies interfere with a predetermined number of the radio frequencies; and
   utilizing the first set of radio frequencies if the set of harmonic frequencies interfere with a second predetermined number of the radio frequencies.

4. A method for determining the switching frequency of a DC-to-DC power supply as in claim 3, further comprising the step of:
   storing at the portable radio transceiver the switching frequency of the DC-to-DC converter based upon the current radio receiver frequency.

5. A method for selecting a plurality of switching frequencies for eliminating the effects of switching interference in a DC-to-DC switching regulator used in a portable radio transceiver comprising the steps of:
   selecting a plurality of switching frequencies used with the DC-to-DC switching regulator;
   determining a plurality of harmonic frequencies based on the plurality of switching frequencies;
   determining those harmonic frequencies of the plurality of harmonic frequencies that fall within the frequency bands of interest;
   identifying the primary radio frequencies within the frequency bands of interest where the harmonic frequencies can provide interference;
   identifying those harmonic multiples that fall within a specific radio channel;
   comparing the list of switching frequencies multiples to a list of primary radio frequencies;
   determining if there is one switching frequency of the plurality of switching frequencies that does not fall within a radio channel;
   incrementing a counter to record the number of channels having no interference by any switching frequency; and
   selecting a second set of switching frequencies if the counter does not increment to a predetermined value.

6. A method for determining the switching frequency of a DC-to-DC power supply as in claim 5, further comprising the step of:
   storing at the portable radio transceiver the switching frequency of the DC-to-DC converter based upon the current radio receiver frequency.

* * * * *